(12) United States Patent
Sicking (10) Patent No.: US 9,145,943 B2
(45) Date of Patent: Sep. 29, 2015

(54) SYSTEMS AND METHODS FOR ABSORBING ENERGY

(71) Applicant: The UAB Research Foundation, Birmingham, AL (US)

(72) Inventor: Dean Sicking, Indian Springs Village, AL (US)

(73) Assignee: The UAB Research Foundation, Birmington, AL (US)

( * ) Notice: Subject to any disclaimer, the term of this patent is extended or adjusted under 35 U.S.C. 154(b) by 0 days.

(21) Appl. No.: 14/069,520

(22) Filed: Nov. 1, 2013

(65) Prior Publication Data

US 2015/0008084 A1 Jan. 8, 2015

Related U.S. Application Data

(60) Provisional application No. 61/842,245, filed on Jul. 2, 2013, provisional application No. 61/856,382, filed on Jul. 19, 2013.

(51) Int. Cl.
*F16F 7/12* (2006.01)

(52) U.S. Cl.
CPC ...................... *F16F 7/125* (2013.01)

(58) Field of Classification Search
CPC ....................................................... F16F 7/125

USPC .................. 188/377, 371, 374; 267/139, 140; 293/133; 296/187.03, 187.09, 187.1, 296/187.11; 256/1, 13.1, 65.01, 70, DIG. 6; 404/6, 9, 11

See application file for complete search history.

(56) References Cited

U.S. PATENT DOCUMENTS

| | | | | |
|---|---|---|---|---|
| 3,482,653 A * | 12/1969 | Nishimura et al. | ........... | 188/374 |
| 3,865,418 A * | 2/1975 | Saxl | ............................. | 293/133 |
| 3,912,295 A * | 10/1975 | Eggert, Jr. | ..................... | 280/784 |
| 4,272,114 A * | 6/1981 | Hirano et al. | ................. | 293/133 |
| 5,391,016 A * | 2/1995 | Ivey et al. | ......................... | 404/6 |
| 5,957,435 A * | 9/1999 | Bronstad | ..................... | 256/13.1 |
| 6,715,735 B2 * | 4/2004 | Bligh et al. | .................. | 256/13.1 |
| 7,147,088 B2 * | 12/2006 | Reid et al. | ..................... | 188/377 |
| 7,401,825 B2 * | 7/2008 | Frank et al. | ................... | 293/155 |
| 8,454,064 B2 * | 6/2013 | Frank | ............................ | 293/155 |
| 2010/0206676 A1 * | 8/2010 | Obrecht | .................... | 188/322.19 |
| 2012/0217459 A1 * | 8/2012 | Smith et al. | .................. | 256/13.1 |

\* cited by examiner

*Primary Examiner* — Thomas J Williams
*Assistant Examiner* — Mariano Sy
(74) *Attorney, Agent, or Firm* — Thomas | Horstemeyer, LLP (57) ABSTRACT

An energy absorbing system includes a tube section having a distal end and an energy absorber mounted to the tube section and receiving its distal end, the energy absorber including a folding section and a compressing section inward, the folding section being adapted to fold opposed walls of the tube section and the compressing section being adapted to compress the tube section after it has been folded.

39 Claims, 6 Drawing Sheets

SYSTEMS AND METHODS FOR ABSORBING ENERGY

CROSS-REFERENCE TO RELATED APPLICATION(S)

This application claims priority to U.S. Provisional Application Ser. No. 61/842,245, filed Jul. 2, 2013, and U.S. Provisional Application Ser. No. 61/856,382, filed Jul. 19, 2013, which are hereby incorporated by reference herein in their entirety.

BACKGROUND

Energy absorbers are used in various applications. One such application is on public roads to cushion vehicle crashes. For example, energy absorbers are commonly employed within guardrails provided along the sides of roads as well as in crash cushions mounted on stopped or slow-moving construction vehicles to absorb the energy of a crashing vehicle.

While many energy absorbers exist that are effective at cushioning crashes, they are often undesirably expensive to manufacture and replace. It would therefore be desirable to have a highly effective energy absorber that is less expensive so that high energy absorption per unit cost can be achieved.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

As described above, it would be desirable to have a highly effective energy absorber that is less expensive so that high energy absorption per unit cost can be achieved. Disclosed herein are systems and methods for energy absorption that achieve that goal. In one embodiment, the systems and methods utilize a tube-folding energy absorber that is adapted to fold and compress a tube when impact forces from an object, such as a crashing car, are transmitted to the energy absorber. In some embodiments, the energy absorber comprises a folding section that initiates folds along opposing sides of the tube and a compressing section that compresses the folded tube. With this folding and compressing process, substantial impact forces are absorbed.

In the following disclosure, various specific embodiments are described. It is to be understood that those embodiments are example implementations of the disclosed inventions and that alternative embodiments are possible. All such embodiments are intended to fall within the scope of this disclosure.

Figure 1:
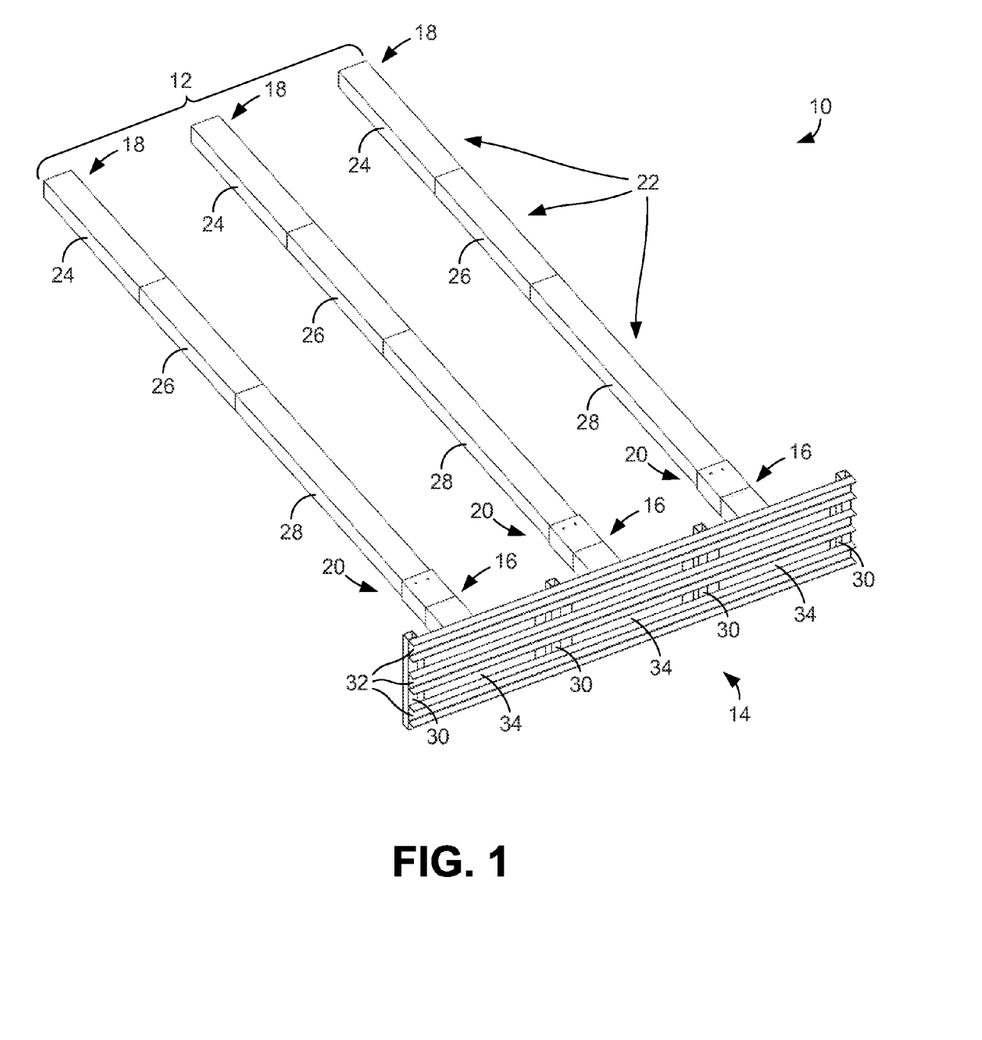
FIG. 1 is a perspective view of an embodiment of an energy absorbing system.

FIG. 1 illustrates an embodiment of an energy absorbing system 10. The system 10 can, for example, be mounted to the rear of a stopped or slow-moving vehicle to absorb the impact of another vehicle that could crash into the stopped or slow-moving vehicle. As shown in FIG. 1, the system 10 generally comprises multiple elongated beams 12, an impact plate 14, and multiple energy absorbers 16 that mount the impact plate to the beams.

The elongated beams 12 comprise proximal ends 18 that, in some cases, are nearest to the vehicle to which the system 10 is mounted and distal ends 20 to which the energy absorbers 16 are mounted. In some embodiments, the beams 12 comprise multiple tube sections 22 that can be made of a strong material, such as steel. As shown in FIG. 1, the tube sections 22 are connected to each other end-to-end. In some embodiments, the tube sections 22 can be butt-welded to each other. Alternatively, splice plates can be used when the tube sections 22 are too thin to butt-weld.

The tube sections 22 can have rectangular cross-sections formed by thin walls. The thickness of the walls of the tube sections 22 can vary along the length of the beams 12. In some embodiments, a first or proximal tube section 24 has relatively thick walls, a second or intermediate tube section 26 has relatively thinner walls, and a third or distal tube section 28 has walls that are even thinner than those of the intermediate tube section. By way of example, the proximal tube section 24 can have 10 gauge walls, the intermediate tube section 26 can have 12 gauge walls, and the distal tube section 28 can have 14 gauge walls. With such a construction, the distal tube section 28 will deform more easily than the intermediate tube section 26, which will deform more easily than the proximal tube section 24. Irrespective of the wall thicknesses, each tube section 22 can be several inches wide and several inches tall in cross-section.

With further reference to FIG. 1, the impact plate 14 can comprise multiple vertical beams 30 to which are mounted multiple horizontal beams 32. Each of these beams 30, 32 can likewise be made of a strong material, such as steel. In the illustrated embodiment, each vertical beam 30 comprises a tube having a rectangular cross-section and each horizontal beam 32 comprises a channel member having a U-shaped cross-section. The sides of the horizontal beams 32 that form the sides of the "U" face outward toward objects (e.g., vehicles) that may crash into the impact plate 14. In this configuration, the legs of the beams 32 extend toward an impacting vehicle. Upon impact, the legs dig into the front of the impacting vehicle to produce mechanical interlock that prevents the vehicle from under-riding or climbing over the energy absorbers 16.

Figure 2:
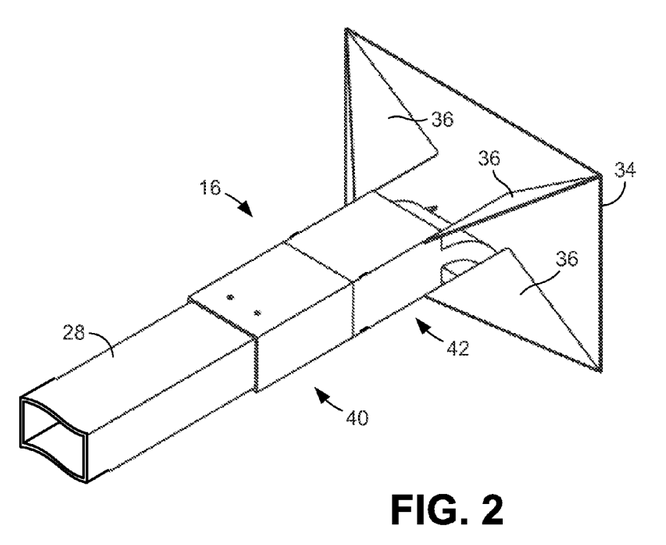
FIG. 2 is a perspective view of an embodiment of an energy absorber and mounting plate that can be used in the energy absorbing system of FIG. 1.

The impact plate 14 mounts to the energy absorbers 16 with mounting plates 34, which are illustrated more clearly in FIG. 2. The mounting plates 34 can comprise rectangular steel plates that are welded to the energy absorbers 16. As is shown in FIG. 2, gussets 36 can also be welded to the mounting plates 34 and the energy absorbers 16 to provide reinforcement. Like the mounting plates 34, the gussets 36 can also be made of steel. In the illustrated embodiment, the gussets 36 are triangular in shape. FIG. 2 also shows the connection between the distal tube section 28 and the energy absorber 16. As is described in further detail below, it is the distal tube section 28 that is folded and compressed by the energy absorber 16 in the event of impact.

Figure 3:
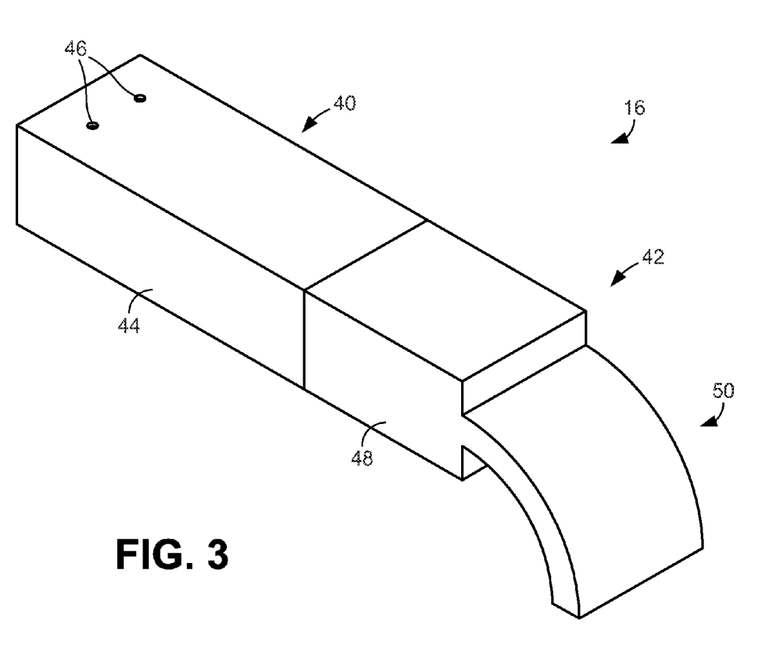
FIG. 3 is a perspective view of the energy absorber shown in FIG. 2.

FIG. 3 illustrates an energy absorber 16 separate from the remainder of the energy absorbing system 10. The energy absorber 16 can be used in a sacrificial crash cushion. In some embodiments, the energy absorber 16 is made entirely of steel. As shown in FIG. 3, the energy absorber 16 generally comprises a first section 40 and a second section 42. In some embodiments, the first section 40 folds the distal tube section 28 and the second section 42 compresses the distal tube section. Accordingly, the first section 40 can be referred to as the folding section and the second section 42 can be referred to as the compressing section. Those terms will be used from this point onward.

As shown in FIG. 3, the folding section 40 can comprise a tubular member 44 having a generally rectangular cross-section. As is apparent in FIG. 2, the folding section 40 can be slightly larger than the distal tube section 28 such that a portion of the distal tube section can fit within the folding section. In such a case, the folding section 40 can comprise mounting holes 46 through which fasteners, such as bolts, can be passed to secure the energy absorber 16 to the distal tube section 28.

With further reference to FIG. 3, the compressing section 42 comprises a tubular member 48 also having a generally rectangular cross-section. In addition, the compressing section 42 comprises a curved extension 50 that extends outward and downward from the tubular member 48. The nature and function of the compressing section 42 are described further below in relation to FIGS. 5 and 6.

Figure 4:
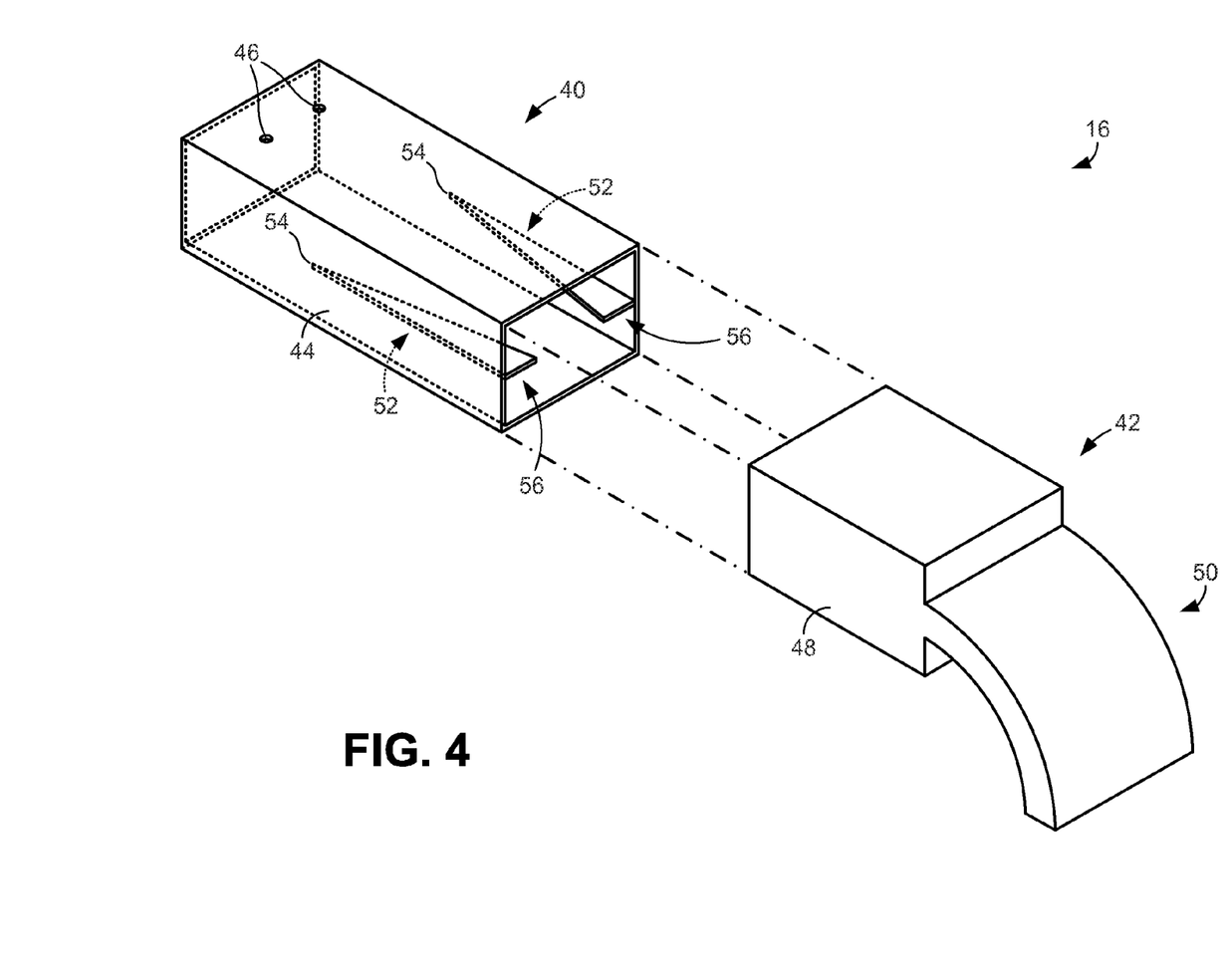
FIG. 4 is an exploded perspective view of the energy absorber of FIG. 3.

FIG. 4 illustrates the energy absorber 16 in an exploded view. In this view, the interior of the folding section 40 is visible. It can be seen that inner folding elements 52 are provided within the tubular member 44 of the folding section 40 that are adapted to fold the distal tube section 28 when impact forces are transmitted to the energy absorber 16. As shown in FIG. 4, the folding elements 52 are provided on opposite walls of the tube member 44. In the illustrated embodiment, the folding elements 52 are provided on opposed lateral (vertical) walls of the tube member 44. As illustrated in FIG. 4, the folding elements 52 can comprise thin, inwardly extending, triangular wedges that are medially positioned along the heights of the lateral walls and that extend along a length direction of the tubular member 44. More particularly, the folding elements 52 progressively extend outward from the walls from an origin point 54 within the tubular member 44 to an end point 56 adjacent a distal end of the tubular member. In some embodiments, the folding elements 52 extend out from the lateral walls of the tubular member 44 at a constant angle of approximately 5 to 45° and reach a maximum width (i.e., the distance from the wall from which it extends) of approximately ⅛ to ⅓ of the height of the walls. These parameters can be adjusted to increase or decrease the amount of friction in the system 10. Increasing the friction increases energy dissipation rates.

Figure 7A:
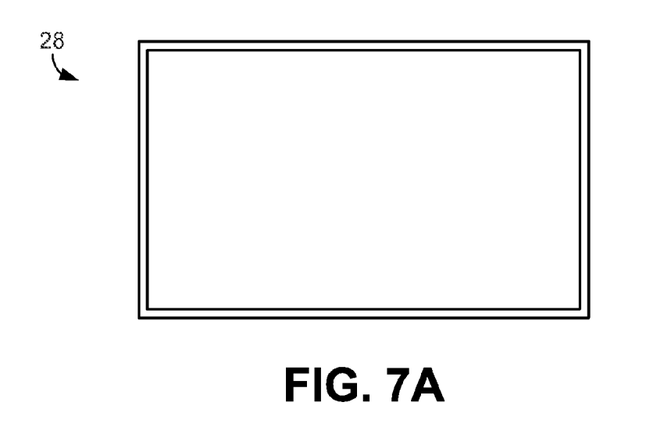
FIGS. 7A-7C are end views of a tube section showing different stages of deformation caused by the energy absorber of FIGS. 3 and 4.
Figure 7B:
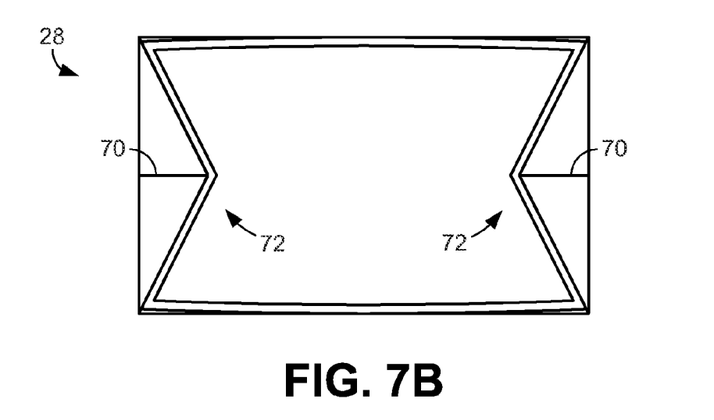

With the configuration described above, the folding section 40 is adapted to progressively fold the distal tube section 28 as it moves through the folding section. In particular, as the energy absorber 16, and therefore the folding section 40, moves backward under the force of an impact, it passes over the distal tube section 28 and the folding elements 52 fold opposed sides of the tube section inward. Such folding is depicted by FIGS. 7A and 7B described below. As is also apparent from FIG. 4, the origin points 54 of the folding elements 52 can be located at a medial position along the length of the tubular member 44 so that there is space within the tubular member to receive the distal tube section 28 in an unfolded state.

Figure 5:
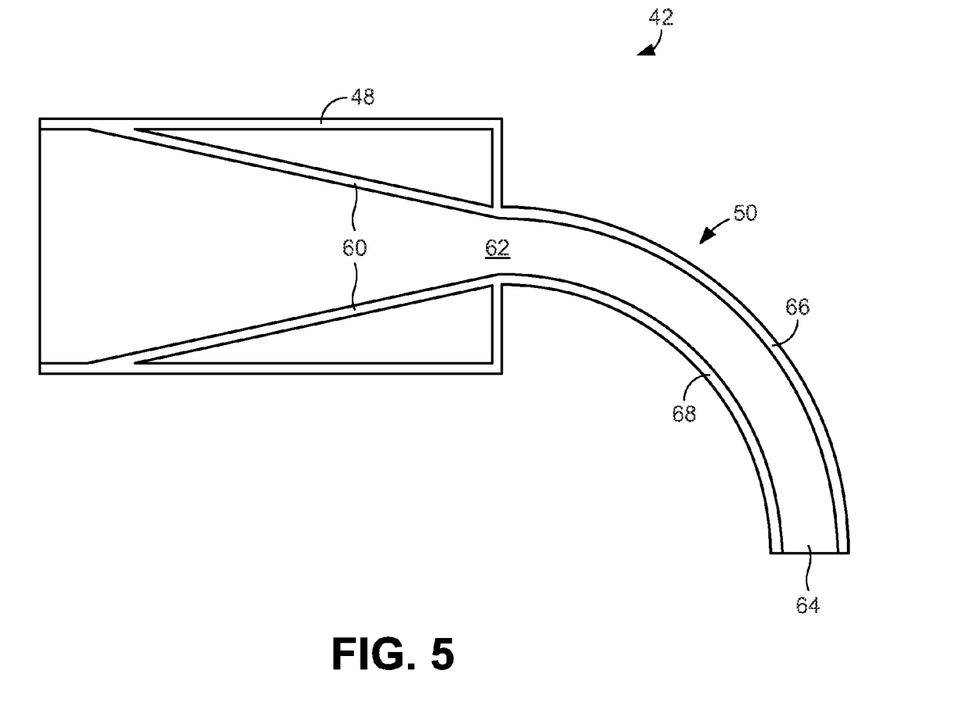
FIG. 5 is a cross-sectional side view of a compressing section of the energy absorber of FIGS. 3 and 4.

FIG. 5 shows the compressing section 42 in cross-section. As can be appreciated from this figure, provided within the tubular member 48 of the compressing section 42 are inner angled elements 60 that extend from opposed walls of the tubular member. The angled elements 60 can also be made of a strong material, such as steel. In the illustrated embodiment, the angled elements 60 extend from the top and bottom (horizontal) walls of the tubular member 48. In some embodiments, the angled elements 60 extend out from the walls of the tubular member 48 at a constant angle of approximately 5 to 45°. The angled elements 60 extend toward each other from a proximal end to a distal end of the tubular member 48 so that the space that will be traversed by the distal tube section 28 in the event of an impact narrows from the full height of the tubular member 48 to a height of approximately 15 to 30 mm. That height is generally equal to the height of the inlet 62 of the curved extension 50 that extends outward from a distal end of the tubular member 48.

As indicated in FIGS. 3 and 4, the curved extension 50 of the compressing section 42 has a width that is generally equal to the width of the tubular member 48 from which it extends. With reference again to FIG. 5, the curved extension 50 curves downward (in the illustrated embodiment) so that the outlet 64 of the extension points downward and is approximately 90 degrees out of phase from the inlet 62. The top and bottom walls 66 and 68 of the curved extension 50 are curved and, in some embodiments, have a constant radius of curvature. By way of example, the top wall 66 has a radius of curvature of approximately 100 to 300 mm and the bottom wall 68 has a radius of curvature of approximately 75 mm. With such a configuration, the top and bottom walls 66, 68 of the curved extension 50 define a curved interior path that forces an object traversing it, such as the distal tube section 28, to deform in a curved manner.

FIGS. 6A-6E illustrate different stages of deformation of the distal tube section 28 by the energy absorber 16 during an impact. Beginning with FIG. 6A, the distal tube section 28 is positioned within the folding section 40 at a location upstream from the origin points 54 of the folding elements 52. In this state, the distal tube section 28 has not been folded and its distal end still has a generally rectangular shape, such as that depicted in FIG. 7A.

Figure 6A:
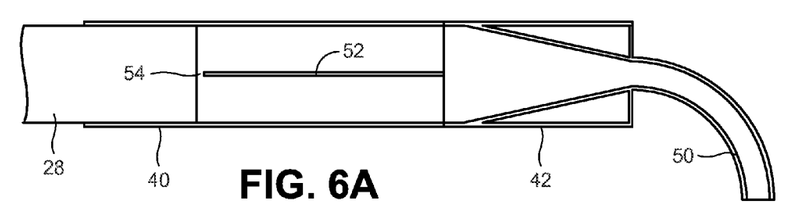
FIGS. 6A-6E are cross-sectional side views of the energy absorber of FIGS. 3 and 4 illustrating sequential deformation of a tube section in the event of an impact.
Figure 6B:
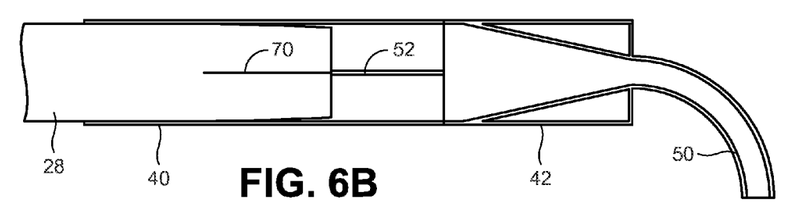

When an object, such as a vehicle, impacts the impact plate 14 of the energy absorbing system 10 (FIG. 1), the impact forces are transmitted to the energy absorber 16, which is pushed back along the distal tube section 28. If the distal tube section 28 is secured to the energy absorber 16 with fasteners such as bolts, the fasteners are sheared off from the impact forces. As the energy absorber 16 is pushed back along the distal tube section 28, the distal tube section, in essence, travels through the energy absorber. Such travel is depicted in FIG. 6B. As shown in that figure, the distal tube section 28 has traversed part of the folding section 40 of the energy absorber 16 and therefore has been partially folded by the folding elements 52 of the folding section. A fold line 70 is visible in FIG. 6B. Such folding is also illustrated in FIG. 7B, which shows the lateral (vertical) walls of the distal tube section 28 folded inward toward each other along the fold lines 70 so as to form inwardly extending V-shaped creases 72. As described below, this inward folding facilitates later compression of the distal tube section 28 by the compressing section 42.

Figure 6C:
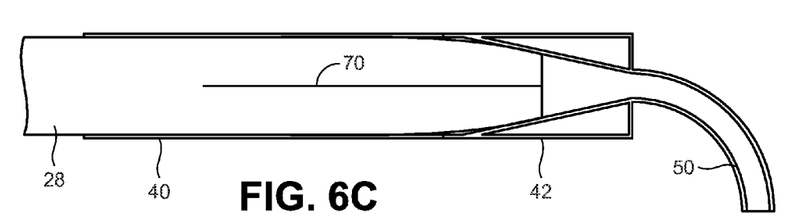
Figure 7C:
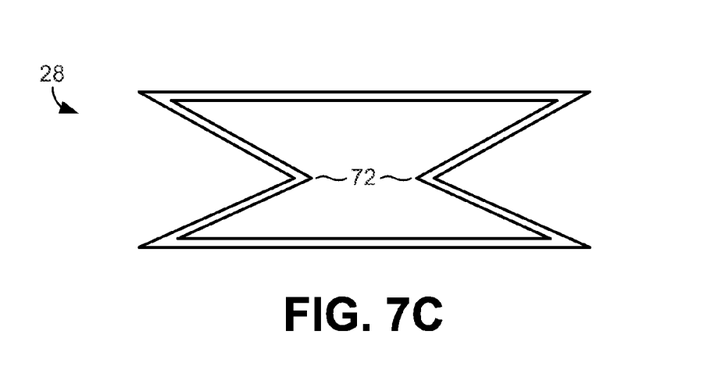

As the distal tube section 28 continues to traverse the energy absorber 16, it enters the compressing section 42, as illustrated in FIG. 6C. Because of the angled elements 60 of the compressing section 42, the distal tube section 28 is compressed inward. In the illustrated embodiment, the top and bottom of the walls are compressed inward toward each other. Notably, this compression occurs in a controlled fashion along the fold lines 70 and creases 72. When it reaches its maximum compression, the distal tube section 28 will be flattened to a great degree. As illustrated in FIG. 7C, the distal tube section 28 may be approximately ¼ as tall as it originally was before compression (see FIG. 7A). This compression dissipates substantial amounts of energy from the impact.

Figure 6D:
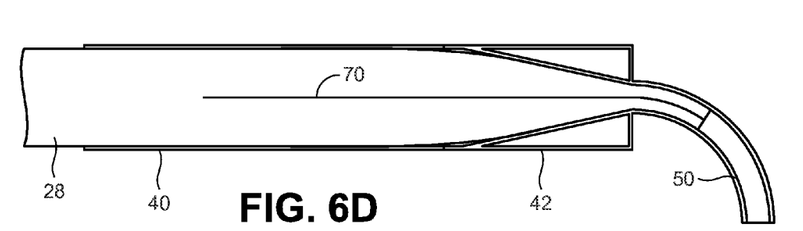
Figure 6E:
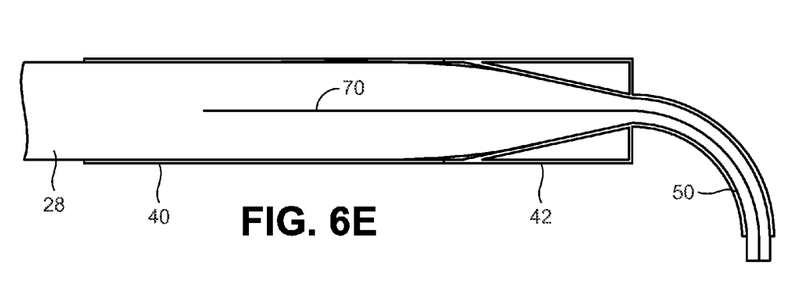

Referring next to FIG. 6D, as the distal tube section 28 continues to pass through the energy absorber 16, it enters into the curved extension 50 of the compressing section 42 through the inlet 62 (FIG. 5) and is curved downward by the walls of the extension. This deformation and deflection of the distal tube section 28 also dissipates substantial amounts of energy. In addition, it directs the distal tube section 28 away from the object (e.g., vehicle) that created the impact. Depending upon the force of the impact, the distal tube section 28 may pass through the entirety of the curved extension 50 and emerge from the curved extension through its outlet 64, as illustrated in FIG. 6E.

In some embodiments, the above-described deformation of the distal tube section 28 can be facilitated by galvanizing the tube section and the energy absorber 16. In some embodiments, the assembled energy absorber 16 and distal tube section 28 can be dipped in an appropriate galvanizing liquid, such as zinc, which will coat the surfaces of the energy absorber and the tube section with a layer of material that acts as a lubricant in a high-energy impact.

As can be appreciated from the above discussion, the disclosed energy absorbing system operates by first folding and then compressing and bending a thin-walled tube. One advantage of the energy absorber system is that it is relatively inexpensive because it comprises simple components made of inexpensive materials, such as steel. In addition, the system can be mounted near the center of the crash cushion so that there is no need to provide moment resistance. Furthermore, restoration of the sacrificial system is relatively simple.

Alternative embodiments are possible for the disclosed energy absorbing system and energy absorbers. In one such alternative, slots can be formed in the walls of the distal tube section that align with the folding elements of the energy absorber. In such an embodiment, the slots reduce the amount of material along the fold lines of the distal tube section and therefore facilitate folding of the tube section. In such cases, the walls of the distal tube section can be made thicker, if desired. In another alternative, the distal tube section to which the energy absorber mounts can be pre-folded so that no folding elements need be provided within the energy absorber.

The invention claimed is:

1. An energy absorbing system comprising:
a tube section having a distal end; and
an energy absorber mounted to the tube section and receiving its distal end, the energy absorber including a folding section and a compressing section, the folding section being adapted to fold opposed walls of the tube section inward and the compressing section being adapted to compress the tube section after the tube section has been folded, wherein the compressing section comprises a tubular member and a curved extension that extends outward from the tubular member.

2. The energy absorbing system of claim 1, wherein the tube section is part of an elongated beam that includes multiple tube sections aligned end to end.

3. The energy absorbing system of claim 2, wherein the tube sections have different wall thicknesses.

4. The energy absorbing system of claim 1, wherein the tube section is rectangular in cross-section and includes top, bottom, and lateral walls.

5. The energy absorbing system of claim 4, wherein the folding section of the energy absorber is adapted to fold the lateral walls inward.

6. The energy absorbing system of claim 1, wherein the folding section comprises a tubular member that receives the distal end of the tube section and inner folding elements adapted to fold opposed walls of the tube section.

7. The energy absorbing system of claim 6, wherein the tubular member is rectangular in cross-section.

8. The energy absorbing system of claim 6, wherein the folding elements comprise inwardly extending wedges that extend along a length direction of the tubular member.

9. The energy absorbing system of claim 8, wherein the inwardly extending wedges are positioned medially along the heights of lateral walls of the tubular member.

10. The energy absorbing system of claim 9, wherein the inwardly extending wedges progressively extend outward from the lateral walls as the tubular member is traversed towards its distal end.

11. The energy absorbing system of claim 1, wherein the tubular member includes inner angled elements that extend toward each other as the tubular member is traversed toward the curved extension so as to be adapted to compress the tube section as the tube section traverses the tubular member.

12. The energy absorbing system of claim 1, further comprising an impact plate mounted to the energy absorber.

13. An energy absorber comprising:
a folding section adapted to fold opposed walls of a thin-walled tube section inward; and
a compressing section adapted to compress the tube section after the tube section has been folded, wherein the compressing section comprises a tubular member and a curved extension that extends outward from the tubular member.

14. The energy absorber of claim 13, wherein the folding section comprises a tubular member adapted to receive a distal end of the tube section and inner folding elements adapted to fold opposed walls of the tube section.

15. The energy absorber of claim 14, wherein the tubular member is rectangular in cross-section.

16. The energy absorber of claim 14, wherein the folding elements comprise inwardly extending wedges that extend along a length direction of the tubular member.

17. The energy absorber of claim 16, wherein the inwardly extending wedges are positioned medially along the heights of lateral walls of the tubular member.

18. The energy absorber of claim 17, wherein the inwardly extending wedges progressively extend outward from the lateral walls as the tubular member is traversed towards its distal end.

19. The energy absorber of claim 18, wherein the inwardly extending wedges progressively extend outward from the lateral walls at an angle of approximately 5 to 45 degrees.

20. The energy absorber of claim 19, wherein the inwardly extending wedges have a maximum width of approximately ⅛ to ⅓ the height of the lateral walls.

21. The energy absorber of claim 13, wherein the tubular member includes inner angled elements that extend toward each other as the tubular member is traversed toward the curved extension so as to be adapted to compress the tube section as the tube section traverses the tubular member.

22. The energy absorber of claim 21, wherein the inner angled elements extend outward from opposed walls of the tubular member at an angle of approximately 5 to 45 degrees.

23. A method for absorbing energy from an impact, the method comprising:

first passing a tube section having opposed walls through a folding section of an energy absorber, the folding section folding the opposed walls inward to facilitate compressing of the tube section; and next passing the folded tube section through a compressing section of the energy absorber, the compressing section comprising a tubular member that compresses the tube section and a curved extension that bends and deflects the tube section to absorb energy.

24. An energy absorbing system comprising:
a tube section including a distal end having a rectangular cross-section formed by four orthogonal planar walls; and
an energy absorber mounted to the tube section and receiving its distal end, the energy absorber including:
a folding section comprising opposed inner folding elements adapted to fold opposed planar walls of the tube section inward toward each other and form creases in the opposed planar walls that facilitate compressing of the tube section, and
a compressing section distal of the folding section, the compressing section being adapted to compress the creased walls of the tube section.

25. The energy absorbing system of claim 24, wherein the inner folding elements are adapted to fold vertical planar walls of the tube section inward.

26. The energy absorbing system of claim 24, wherein the folding section comprises a rectangular tubular member and the inner folding elements comprise thin, planar wedges that extend perpendicularly inward from opposed walls of the tubular member along a length direction of the tubular member, the wedges being perpendicular to the opposed planar walls of the tube section.

27. The energy absorbing system of claim 26, wherein the inwardly extending wedges are positioned medially along the heights of vertical walls of the tubular member.

28. The energy absorbing system of claim 27, wherein the inwardly extending wedges progressively extend outward from the vertical walls of the tubular member as the tubular member traversed towards its distal end.

29. The energy absorbing system of claim 24, wherein the compressing section comprises a tubular member and a curved extension that extends outward from the tubular member.

30. The energy absorbing system of claim 29, wherein the tubular member includes inner angled elements that extend toward each other as the tubular member is traversed toward the curved extension so as to be adapted to compress the tube section as it traverses the tubular member.

31. The energy absorbing system of claim 24, further comprising an impact plate mounted to the energy absorber.

32. An energy absorber comprising:
a folding section adapted to receive a rectangular tube section including a distal end having a rectangular cross-section formed by four orthogonal planar walls, the folding section including opposed inner folding elements adapted to fold opposed planar walls of the tube section inward toward each other and form creases in the opposed planar walls that facilitate compressing of the tube section; and
a compressing section adapted to compress the creased walls of the tube section.

33. The energy absorbing system of claim 32, wherein the inner folding elements are adapted to fold vertical planar walls of the tube section inward.

34. The energy absorbing system of claim 32, wherein the folding section comprises a rectangular tubular member and the inner folding elements comprise thin, planar wedges that extend perpendicularly inward from opposed walls of the tubular member along a length direction of the tubular member, the wedges being perpendicular to the opposed planar walls of the tube section.

35. The energy absorbing system of claim 34, wherein the inwardly extending wedges are positioned medially along the heights of vertical walls of the tubular member.

36. The energy absorbing system of claim 35, wherein the inwardly extending wedges progressively extend outward from the vertical walls of the tubular member as the tubular member traversed towards its distal end.

37. The energy absorbing system of claim 32, wherein the compressing section comprises a tubular member and a curved extension that extends outward from the tubular member.

38. The energy absorbing system of claim 37, wherein the tubular member includes inner angled elements that extend toward each other as the tubular member is traversed toward the curved extension so as to be adapted to compress the tube section as it traverses the tubular member.

39. The energy absorbing system of claim 32, further comprising an impact plate mounted to the energy absorber.

* * * * *